(No Model.)
S. H. T. TILGHMAN.
HOE.
No. 384,879. Patented June 19, 1888.
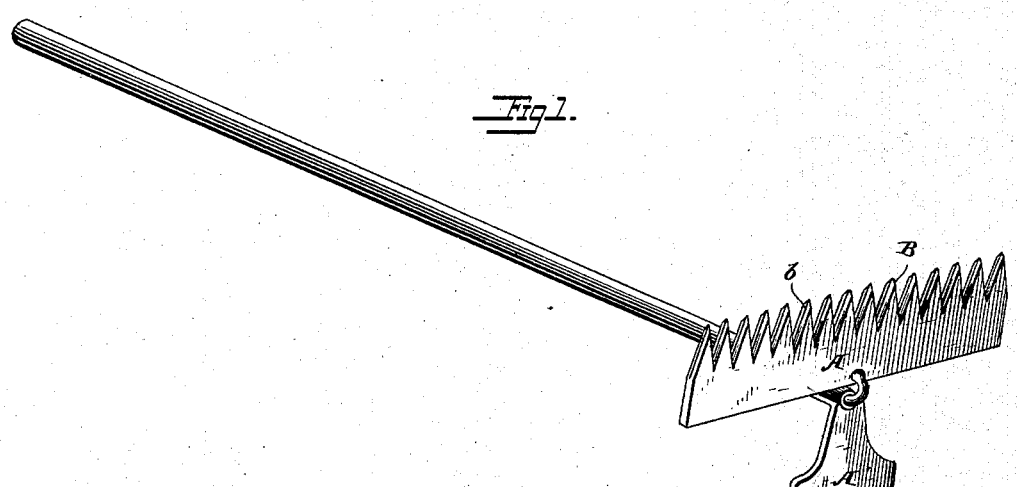
Fig. 1.
Fig. 2.
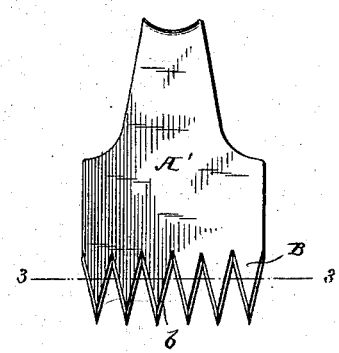
Fig. 3.
Attest:
Jno. F. Hinkel Jr.
H. S. McArthur.
Inventor:
Samuel H. T. Tilghman
by J. S. Barker
Atty.

UNITED STATES PATENT OFFICE.

SAMUEL H. T. TILGHMAN, OF WORCESTER COUNTY, MARYLAND.

HOE.

SPECIFICATION forming part of Letters Patent No. 384,879, dated June 19, 1888.

Application filed February 28, 1888. Serial No. 265,624. (No model.)

*To all whom it may concern:*

Be it known that I, SAMUEL H. T. TILGHMAN, a citizen of the United States, residing at Sixth Election District, in the county of Worcester and State of Maryland, (my post-office address being Whiton, Wicomico county, Maryland,) have invented certain new and useful Improvements in Hoes; and I do hereby declare the following to be a full, clear, and exact description of the invention, such as will enable others skilled in the art to which it appertains to make and use the same.

This invention relates to hoes particularly adapted for the pulling and cutting of weeds and for use among growing plants; and it consists of a hoe having its edge serrated or provided with teeth of a peculiar shape, whereby they are well adapted to engage with and draw the weeds from the ground, said teeth being sharpened in a novel manner, whereby they are adapted to longer retain their sharpness than are hoes having serrated edges, constructed as has heretofore been common. To these ends I make the spaces between the adjacent teeth of a depth greater than the distance between the points of the teeth, so that the weeds and grass shall so wedge between them that they will not slip out as the implement is drawn back; and I further sharpen the teeth from both faces of the hoe, so that the cutting-edges thereof lie between the two opposite faces of the hoe and teeth and are hence in a great measure protected thereby from contact with stones and other objects which would tend to dull them.

In order that my invention may be understood, I have illustrated it in certain drawings, forming part of this specification, and wherein—

Figure 1 is a perspective view of an implement having my invention applied thereto. Fig. 2 is a face view of a hoe containing my invention, and Fig. 3 is a section on the line 3 3, Fig. 2.

The hoe may be of any preferred shape in general outline, two forms being shown, one, A, having a broad blade and adapted for general use, and the other, A', having a narrow blade and particularly adapted for use among growing plants.

The edge of the hoe is serrated or toothed, the teeth B being narrow, comparatively long, and tapering to a point, and so related to each other that the spaces between them are wedge-shaped, having a depth greater than the width between the points of the teeth. The edges of the teeth are sharpened to form cutting-edges *b*. Instead of sharpening the teeth entirely from one side, as has heretofore been common in hoes having toothed edges, I sharpen them from both sides, so that the cutting-edges *b* shall lie between the two opposite plain faces of the hoe. This insures that they shall be in a great measure protected from contact with stones and other hard substances, so that a hoe so sharpened maintains a proper cutting-edge for a much longer time than were it sharpened from one side only, and the cutting-edges were in the plane of one of the faces of the hoe.

The particular advantage incident to the shape of the teeth—that is, having a depth greater than the distance between the points of the teeth—is that the hoe may be used for the drawing or pulling of weeds or grass, which will wedge in between the teeth and be thereby held with sufficient security to be drawn.

A hoe thus constructed may be used either to cut the weeds or grass at or just below the surface of the ground or to draw or pull them, according as it is held and used.

The narrow form of hoe is not used so much for breaking up or pulverizing the soil as it is for weeding purposes among growing plants, where its shape adapts it for use among plants, such as strawberries, which after the bearing season largely cover the ground, so that it is almost impossible to work them with a hoe of ordinary shape and which it has heretofore been customary to weed by hand, which is both slow and tedious.

Both forms of hoe, A and A', may be carried by the same handle, as shown in Fig. 1.

I claim—

1. A hoe having a toothed edge, the teeth being sharpened from both sides, whereby the cutting-edges are between the plain faces of the teeth and parallel therewith, substantially as and for the purpose described.

2. A weeding-hoe having its edge provided with narrow teeth, beveled from both sides to form sharp edges between the plain faces of the teeth, the spaces between the teeth being wedge shape and of a depth greater than the distance between the points of the teeth, whereby weeds and grass may be wedged between the teeth and pulled, substantially as described.

In testimony whereof I affix my signature in presence of two witnesses.

SAMUEL H. T. TILGHMAN.

Witnesses:
 EDWARD WHITE,
 WILLIAM S. POWELL.